UNITED STATES PATENT OFFICE.

WALTER A. JACOBS, OF MOUNT VERNON, AND WADE H. BROWN, MICHAEL HEIDELBERGER, AND LOUISE PEARCE, OF NEW YORK, N. Y., ASSIGNORS TO THE ROCKEFELLER INSTITUTE FOR MEDICAL RESEARCH, OF NEW YORK, N. Y., A CORPORATION OF NEW YORK.

ARSENICAL COMPOUND.

1,280,122.

Specification of Letters Patent.  Patented Sept. 24, 1918.

No Drawing.   Application filed October 3, 1917.  Serial No. 194,462.

*To all whom it may concern:*

Be it known that we, WALTER A. JACOBS, Ph. D., residing at Mount Vernon, Westchester county, New York, WADE H. BROWN, M. D., residing at Flushing, in the city of New York, borough of Queens, Queens county, New York, MICHAEL HEIDELBERGER, Ph. D., residing in the city of New York, borough of Manhattan, county and State of New York, and LOUISE PEARCE, M. D., residing in the city of New York, borough of Manhattan, county and State of New York, all citizens of the United States, have jointly invented a new and Improved Arsenical Compound, of which the following is a specification.

In our co-pending applications, Serial Nos. 194,459 and 194,461, we have described a class of arsenical compounds of use in the treatment of trypanosomal or spirochætal infections, composed of an aromatic arsonic acid possessing an α-aminoacylamin side chain, the aromatic nucleus containing the arsenic being joined to the α-amino group in said side chain. We have found that by subjecting the organic arsonic acids described in our said co-pending applications to the action of mild reducing agents, the arsonic acid residue can be smoothly converted into the arsinoxid radical without altering the remainder of the molecule. As a result, in the new type of substances so obtained the chemical groupings which characterized the organic portion of the molecule of the substances described in our aforesaid co-pending applications were retained, but at the same time in many instances the therapeutic efficiency of the parent substances was greatly improved.

These substances were also obtained by reacting the aminophenylarsinoxids with the corresponding α-halogenacylamino compound, such as, for example, chloroacetylanilin, etc.

The following examples will make clear the method of preparation and general character of the substances discovered.

*Example I—N-(Phenyl-p-arsinoxid)-α-phenylglycinamid.*

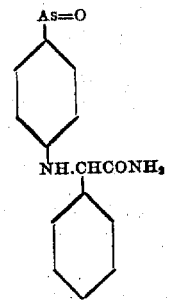

7 grams of N-(phenyl-p-arsonic acid)-α-phenylglycinamid of the following formula

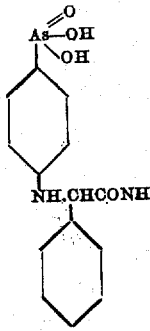

are suspended in 80 cc. hydrochloric acid (1.12 sp. gr.), treated with ½ cc. of 48 per cent. hydriodic acid and a concentrated solution of sodium bisulfite added slowly while the mixture is vigorously shaken or stirred until the mixture is saturated with $SO_2$. Instead of using the sodium-bisulfite, $SO_2$ in gaseous form may be passed through the mixture.

After half an hour the hydrochlorid of the oxid is filtered off and washed with hydrochloric acid (1.12 sp. gr.). The product is suspended in water and ice and ammonium hydroxid is added until the mixture is permanently alkaline to litmus. The oxid, which forms a white flocculent precipitate, is filtered off and thoroughly washed with ice water. For purification it is dissolved in cold dilute sodium hydroxid solution and reprecipitated by the addition of ammonium chlorid solution. The dry powder is almost insoluble in cold water, melting under hot water. It dissolves readily in methyl and ethyl alcohols and acetone.

*Example II—N-(Phenyl-p-arsinoxid)-glycinanilid.*

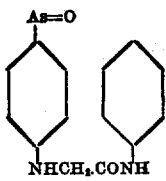

4.4 grams p-aminophenylarsinoxid, 3.5 grams chloracetylanilin, 4 grams sodium iodid, 3 grams sodium acetate and 40 cc. 50 per cent. alcohol are boiled under a reflux for 1½ hours. At the end the clear solution is poured into water. The white flocculent precipitate is filtered and carefully washed with water. For purification it is dissolved in dilute sodium hydroxid solution by gentle warming and precipitated from the filtrate by the addition of sufficient ammonium chlorid solution. The dry product melts between 120 and 155° C. It is smoothly oxidized in alkaline solution by hydrogen peroxid to the arsonic acid.

*Example III—N-(Phenyl-p-arsinoxid)-glycyl-m'-aminophenol.*

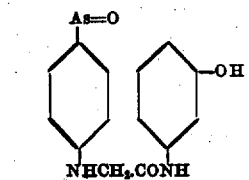

7.5 grams N-(phenyl-p-arsonic acid)-glycyl-m'-aminophenol are suspended in 150 cc. hydrochloric acid (sp. gr. 1.12), a concentrated solution of 1 gram sodium iodid added, and then in small portions, with vigorous stirring, a concentrated sodium bisulfite solution is added until the reaction is completed. The completion is indicated by the permanent disappearance of free iodin and by the presence of $SO_2$ in excess. The thick microcrystalline mass is filtered off and washed with hydrochloric acid (sp. gr. 1.12), and the mass, after suspension in ice water, is carefully neutralized with ammonia. The white flocculent precipitate of oxid is filtered and repurified as in the above examples.

This oxid, when dry, forms a white powder, sparingly soluble in water, but it dissolves easily in dilute alkalis, alcohol, methyl alcohol, acetone and glacial acetic acid. It slowly sinters above 130° C., and is completely melted only above 200°.

*Example IV—N-(Phenyl-p-arsinoxid)-glycylanthranilic acid.*

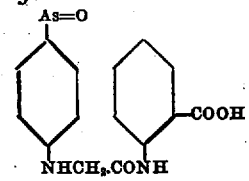

8 grams N-(phenyl-p-arsonic acid)-glycylanthranilic acid are suspended in a mixture of 80 cc. concentrated hydrochloric acid and 80 cc. 95 per cent. alcohol. Partial solution occurs. The mixture is treated with 1 cc., 48 per cent., hydriodic acid, and $SO_2$ passed through it until it is saturated. The yellow precipitate is filtered off and washed with hydrochloric acid (1.12 sp. gr.). The precipitate is then suspended in ice water and dissolved by adding sodium hydroxid in slight excess. The oxid is obtained by cautious addition of dilute acetic acid as long as a white flocculent precipitate is formed. This is filtered and thoroughly washed with water. When freshly precipitated it dissolves easily in cold alcohol, but when dry warming is necessary. It is readily soluble in dilute alkalis and carbonates.

The foregoing are a few examples of substances falling within the spirit and scope of our invention. It will be obvious to any one skilled in the art that many variations in the exact constitution of the substances described may be made without departing from the spirit and scope of our invention.

What we claim is:

1. As a new product, an aromatic arsinoxid having in its molecule an α-aminoacylamin side chain, the aromatic nucleus containing the arsenic being joined to the α-amino group in said side chain.

2. As a new product, an aromatic arsinoxid having in its molecule an α-aminoacyl-arylamin side chain, having the general formula —NHCHRCONHAr, in which R may be alkyl or aryl or hydrogen and Ar is a substituted or unsubstituted aromatic radical.

3. As a new product, an N-(aryl arsinoxid)-glycyloxyarylamin.

4. As a new product, an N-(phenyl arsinoxid)-glycylaminophenol.

5. As a new product, N-(phenyl-p-arsinoxid)-glycyl-m'-aminophenol

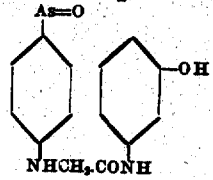

WALTER A. JACOBS, Ph. D.
WADE H. BROWN, M. D.
MICHAEL HEIDELBERGER, Ph. D.
LOUISE PEARCE, M. D.